Patented Feb. 24, 1948

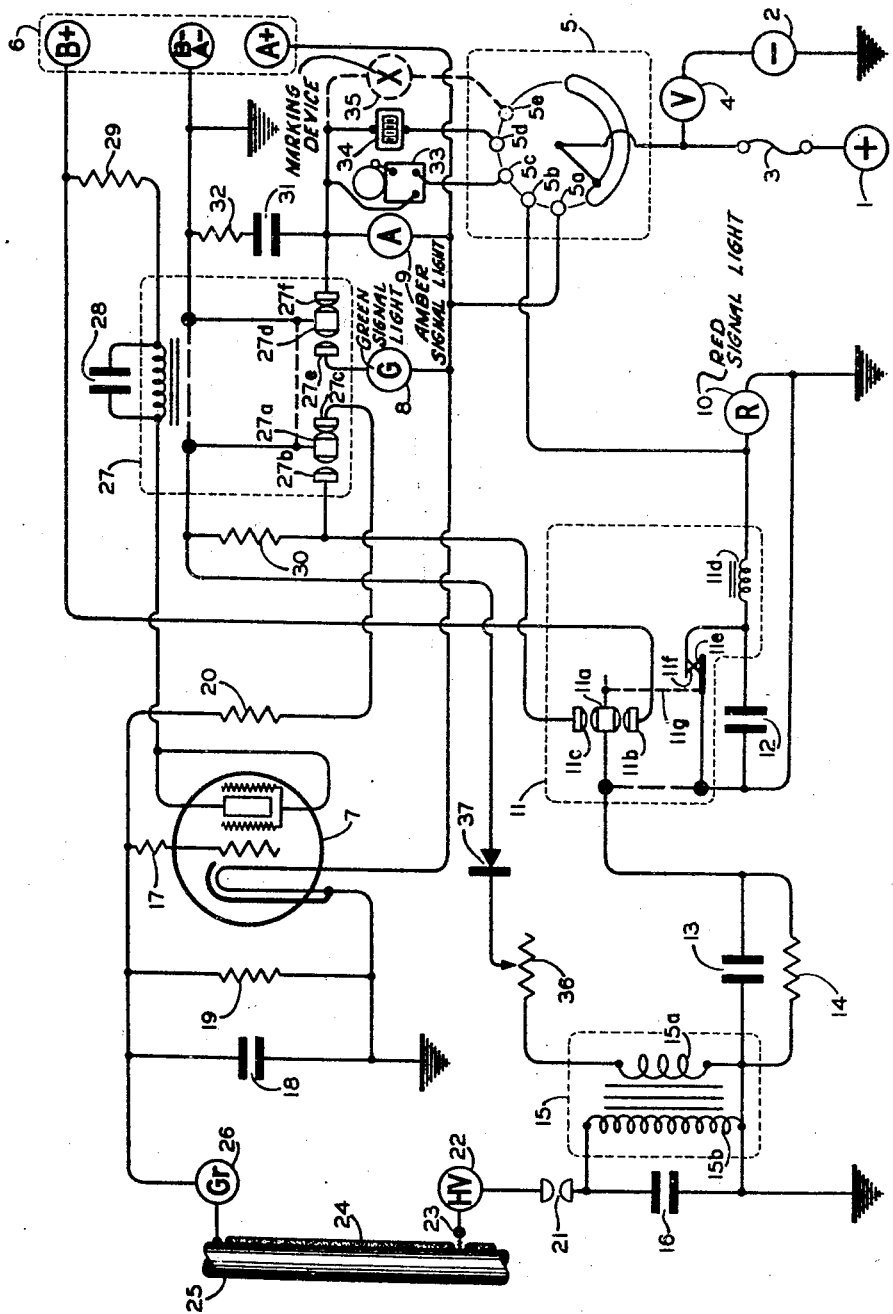

2,436,615

UNITED STATES PATENT OFFICE 2,436,615

APPARATUS FOR DETECTING IMPERFECTIONS IN INSULATING MATERIALS

Dick E. Stearns, Shreveport, La.

Application July 5, 1943, Serial No. 493,514

3 Claims. (Cl. 175—183)

This invention relates to electrical testing apparatus and has for its general object the provision of an electrical testing apparatus which will provide an efficient means for testing insulating materials.

The particular problem to which this invention has been applied is that of testing insulating coatings such as employed on pipe lines and the like.

In protecting pipe lines from corrosion one method heretofore used has been that of coating the pipe with an insulating material so as to prevent the flow from the pipe of any electric current. When a perfect insulating coating is provided, this of course prevents any electrolysis of the pipe and damage to the pipe resulting therefrom. However, if the coating is imperfect at a point, any electric current which may be induced to flow from the pipe due to electrolysis at the given location will be concentrated at that point and will be of much greater value than would the electric current flowing at the given point were there no coating whatever. Under these circumstances a hole would be produced in the pipe much more quickly than if all other conditions were the same and the pipe were left bare. It is therefore highly important that all defects in the insulating coating of such pipes be detected and corrected.

For the purpose of detecting such defects, commonly called and sometimes hereinafter referred to as holidays, there has been employed in the past a high voltage circuit one terminal of which is grounded to the pipe and the other terminal of which is in the form of an electrode, which encircles the pipe and is movable along the pipe. As this electrode is moved along the pipe a spark or arc occurs whenever a defective point is encountered where the insulation provided is insufficient to withstand the testing voltage being applied. However, it is many times impossible to see such a spark because it may be of very slight intensity and may occur for only a fraction of a second. Also, it may occur on the opposite side of the pipe from the observer and it may occur at such a point as to be hidden from the observer by the movable electrode. Inasmuch as such tests are necessarily conducted in many instances in bright sunlight, the visibility of any such spark will of course be greatly reduced thereby. Some reliance has been placed on the observer's ability to detect the sound produced by the spark but this is unsatisfactory because many times a spark would produce very little or no sound, and the conditions under which the testing is necessarily done in many instances would make it impossible because of other and louder noises to detect the sound of a spark.

Certain devices have heretofore been disclosed and claimed in my prior Patent No. 2,304,513, issued December 8, 1942, and in my prior co-pending application, Serial No. 446,578, filed June 11, 1942, for Apparatus for detecting imperfections in insulating materials, both of which devices are capable of producing with certainty clearly sensible signals whenever a moving electrode encounters any defect in an insulating coating over which it is being moved. The present invention constitutes an improvement over my said prior inventions.

One object of the present invention is to provide a device of the character referred to which will require fewer parts than those heretofore devised.

Another object is to provide such a device which will accomplish all of the advantageous results produced by my aforesaid earlier inventions but which will be less expensive and simpler both to manufacture and to operate.

Another object of the invention is to produce a device of the type referred to which will be so simple to operate as to be practically foolproof.

More specifically an object of this invention is to provide a device similar in purpose to my said prior inventions but employing only one thermionic vacuum tube and one relay and having only one external control.

Another object of this invention is to provide a device in which the necessity for dry cell batteries for producing medium voltages will be eliminated.

Another object is to provide a device which will produce a testing impulse having an extremely steep wave front as it increases to its maximum value.

Another object is to provide a device capable of producing testing voltages which will be steadier and more uniform in both polarity and intensity than devices for this purpose heretofore known.

Another object is to produce a structure of the type referred to which will be more rugged and better able to withstand the rough usage of actual operation in the field than devices for the same general purpose heretofore known.

Another object is to provide a device of the character referred to which will be more dependable under all circumstances of operation than devices heretofore known.

Another object of this invention is to provide a device which will produce a high voltage damped oscillatory surge of very short duration in order to as efficiently as possible concentrate the primary power of energy required to produce such oscillatory surge into the initial impulse of said surge.

One other object of this invention is to provide a device for a storage condenser of appreciable capacity which will be charged to the crest voltage of the initial impulse of each oscillatory surge simultaneously with the formation of such impulse, thus providing an instantaneously operated storage means for producing a very substantial discharge spark at a holiday when such is encountered.

Other objects and advantages of this invention will become apparent from the following description taken in connection with the accompanying drawing wherein there is set forth by way of example one embodiment of the invention.

In the drawing the single figure illustrates diagrammatically the electrical parts and circuits of a device constructed in accordance with this invention.

Referring more particularly to the drawing, the numerals 1 and 2 represent the positive and negative terminals respectively of the primary source of D. C. power for the device, which source is preferably in the form of a wet cell storage battery of 6 to 8 volts. It will be seen that the negative terminal 2 of this source of power is grounded to the instrument frame which will be referred to hereinafter as the instrument ground, it being understood that each such illustration of instrument ground connection be preferably connected, by appropriate wiring, at a common point on the said instrument frame. The positive terminal 1 is connected through a suitable fuse 3 to one terminal of the voltmeter 4, and the negative terminal 2 of the power source is connected to the other pole of the voltmeter 4 so that this voltmeter serves at all times to indicate the voltage of the primary source of power.

The positive terminal 1 is also connected to the central point of the unitary multipole control switch 5. This control switch 5 has a rotatable contactor movable to contact successively a series of terminals or contact points 5—a, 5—b, 5—c, 5—d and 5—e. In its first position this movable contactor would contact only the point 5—a. In its second position it would contact the points 5—a and 5—b. In its third position it would contact the points 5—a, 5—b and 5—c, and in its fourth position it would contact the points 5—a, 5—b, 5—c and 5—d, and so on for as many points as are carried by the controller. It will be understood that while five such contact points are illustrated in the drawing, this control switch may incorporate as many contact points as may be desirable for reasons which will hereinafter appear.

When the controller 5 is in position to make contact between the rotatable contactor and the point 5—a, this will serve to connect the positive terminal 1 to the positive terminal of a medium voltage generator in the form of a commercial power pack 6. The negative terminal of the power supply for this pack is connected to the negative terminal 2 by being grounded to the instrument frame as illustrated. At the same time, the positive terminal 1 will be connected to the filament of the vacuum tube 7, with this filament or heater also being connected to the negative terminal 2 by being grounded to the instrument ground as illustrated in the drawing. Thus, when the switch 5 is in a position to make contact with the terminal 5—a, current will be supplied to the power pack 6 and to the heater of the tube 7. The power pack 6 may be of any suitable commercial type producing a sufficient output voltage but is preferably of the vacuum tube rectifying type of D. C. power pack for reasons hereinafter referred to. The vacuum tube 7 is of the tetrode type with an indirectly heated cathode.

With the switch 5 in position to make contact through the terminal 5—a, the positive terminal 1 will also be connected to one terminal of a green signal light G indicated by the numeral 8, and to one terminal of an amber signal light A indicated by the numeral 9.

When moved forward to its next position in which it will make contact also with the terminal 5—b, the switch 5 will provide contact between the positive terminal 1 and the red signal light R indicated by the numeral 10, this signal light being also connected to the negative terminal 2 by being grounded to the instrument ground as indicated. The red signal light 10 is provided as an indication of warning to the operator that the vibrating switch 11 is, as will be described, in operative condition. This terminal 5—b also provides connection to the vibrating switch 11 which may be of any desirable commercial type having the proper characteristics as follows. The vibrator 11 has a movable double contact 11—a carried on a vibrating arm and adapted to contact at the opposite ends of its path of movement with the relatively fixed but resiliently mounted contactors 11—b and 11—c. This vibrator is actuated by means of an actuator coil 11—d which serves to vibrate the movable arm carrying the contactor 11—e and cause this contactor to alternately make and break connection with the relatively fixed but resiliently mounted contactor 11—f. This last mentioned movable arm is electrically insulated from but mechanically connected to the first mentioned vibrator arm carrying the contactor 11—a by means of some suitable insulating connector 11—g. The vibrator arm carrying the contactor 11—e is connected to the instrument ground as indicated and a condenser 12 of suitable capacity is bridged in customary fashion between the fixed contact point 11—f and the vibrator arm carrying the contactor 11—e so as to reduce sparking between these contactors 11—e and 11—f.

It will be seen that with current thus applied to the vibrator 11, the actuator coil 11—d will cause movement of the movable contactor 11—e out of contact with the fixed contactor 11—f and that this will in turn de-energize the coil 11—d whereupon the arm carrying the contactor 11—e will move back to its original position with the contactor 11—e in contact with the contactor 11—f thus re-energizing the coil 11—d and repeating the process. During this time the vibrator arm carrying the contactor 11—a will be moved first into contact with the contactor 11—b and then into contact with the contactor 11—c. It will be seen that the contactor 11—b is connected to the positive output terminal of the power pack 6 and that the movable contactor 11—a is connected to one terminal of a condenser 13. The other terminal of the condenser 13 is connected to the instrument ground as indicated and thus to the negative output terminal of the power pack. Thus, it will be seen that when the contactor 11—a makes contact with the contactor 11—b the condenser 13 will be charged with a voltage substantially equal to the output voltage of the power pack 6. Inasmuch as this charging of the condenser 13 occurs almost instantaneously, there will be little or no tendency toward sparking of the contactors 11—a and 11—b when they are again separated. The resistance 14 is bridged across the condenser 13 but is of a very high value so that it will not immediately discharge the condenser 13 or prevent it from becoming charged, but will serve over a relatively short period of time to bleed off any charge which may be left on the condenser 13 when the operation of the apparatus is stopped.

When the contactor 11—a moves into contact with the contactor 11—c, the condenser 13 will, if the relay 27 is closed in the manner hereinafter described, be discharged through the contactors 27—a and 27—b of the relay 27 and through the primary coil 15—a of the transformer 15. This discharge will be very rapid, thus producing an immediate high voltage peak in the secondary coil 15—b of the transformer 15. This high voltage which incidentally is the testing voltage of the apparatus, serves to charge the condenser 16, and upon the cessation of the discharge current through the primary coil 15—a this condenser 16 will tend to discharge through the secondary coil 15—b which with the condenser 16 forms an oscillating circuit. The net result will be an oscillatory surge of current. Each such oscillatory surge will have an initial impulse of extremely steep wave front and of relatively great voltage intensity and after attaining its crest voltage value it will rapidly decrease to zero potential and, reversing polarity, reach another crest voltage value of opposite polarity and of greatly reduced intensity. Thereupon it will again decrease to zero potential and, reversing polarity, reach another crest voltage of further reduced intensity and finally completely die out after about three such reversals of polarity. The number of reversals of polarity will, however, depend upon other factors which will hereinafter be discussed. It is also to be noted that there are other condenser elements hereinafter to be described which are connected in parallel with the condenser 16 and will serve to somewhat increase the capacity connected across the secondary winding 15—b of transformer 15.

Referring now to the thermionic vacuum tube 7, of which this device employs only one, it will be seen that the indirectly heated cathode is connected to the negative terminal of the filament or heater and that the grid is connected through a fixed resistance 17 with one terminal of the condenser 18 and with one terminal of the fixed resistance 19. Resistor 17 is provided in order to prevent any appreciable grid current from flowing in the event of some inadvertent condition. The other terminals of the condenser 18 and resistance 19 are grounded to the instrument ground as indicated and are thus connected to the negative terminal of the cathode heater and to the cathode of the tube 7. The grid of the tube 7 is also connected through the resistance 17 and through a further fixed resistance 20 to the fixed contactor 27—c of the relay 27 which will later be described.

Connected to the high voltage, or ungrounded terminal of the secondary coil 15—b of the transformer 15 and of the condenser 16 is one side of a spark gap 21. The other side of this spark gap is connected to the high voltage terminal HV designated by the numeral 22, and this terminal is in turn connected to the exploring electrode 23 which is adapted to be moved along the outer surface of an insulating coating 24 on a pipe or the like 25. Grounded to this pipe 25 is the terminal GR of the device, the same being designated by the numeral 26. This terminal 26 is connected to those terminals of the condenser 18 and the resistance 19 which are connected to the grid of tube 7 through resistance 17.

From this description it will be apparent that the condenser 18 is in series with a condenser formed by the exploring electrode 23, the insulating coating 24, and the metallic pipe 25, and further in series with the spark gap 21 having a negligibly small condenser effect, and that the aggregate condenser effect of these elements in series is connected in parallel with the condenser 16. As long as the insulation 24 does not break down or a holiday is not encountered, the charge on the condenser 18 will be relatively very small, but in the event of such breakdown or holiday in the insulation 24, that portion of the condenser system represented by numerals 23, 24, and 25 is destroyed as a condenser and a relatively very great charge is placed upon the condenser 18, the result of which will presently be discussed. It will further be understood that, due to well known principles, the spark gap 21 will provide a damping effect upon the oscillatory surges produced by the transformer 15 in conjunction with the condenser system described and that this damping effect will serve to greatly reduce the time during which each oscillatory surge will continue before dying out. In the event of encountering a holiday of a nature to produce a substantially complete short circuit between the exploring electrode 23, and the surface of the metallic pipe 25, this spark gap 21 will also serve to prevent the condenser 18 from being discharged back through the secondary coil 15—b of the transformer 15 after having received a relatively great charge from condenser 16 upon one breakdown of the condenser formed by the parts bearing the numerals 23, 24, and 25.

Referring now to the relay 27, this relay is of the double pole double throw type having two movable arms insulated from each other. One of the movable arms carries the contactor 27—a which is adapted when the relay is closed to be in electrical contact with the fixed contactor 27—b and when the relay is open to be in contact with the fixed contactor 27—c. The other movable arm carries the contactor 27—d which when the relay is closed is in contact with the fixed contactor 27—e and when the relay is open is in contact with the fixed contactor 27—f. The actuating coil of this relay is connected in the plate circuit of the tube 7 and is bridged by a condenser 28 which serves to prevent rapid variations in the plate current from causing the relay to chatter. Also connected in the plate circuit in series with the actuating coil of the relay is a fixed resistance 29 which provides a substantial portion of the entire resistance in the plate circuit of this tube. The plate voltage is supplied from the positive output terminal of the power pack 6. It will be seen also that the screen grid of tube 7 is connected to the plate thereof externally of the tube. This is done in order to reduce the plate circuit resistance of tube 7 to a minimum. It is to be understood that tube 7 as herein used serves as a switch to operate relay 27. This adaptation is to suddenly cut off all current from power pack 6 through the energizing coil of relay 27 when a holiday is encountered, thus allowing relay 27 to open. It has the further property that immediately there-after it will gradually allow current to increase through the energizing coil of relay 27 back to normal value, thereby causing relay 27 to again close at some predetermined value of current during such build-up between zero and normal value. It thereby constitutes a means for providing a delay period in the closing of the relay 27 after it has been opened as described.

For the purpose of retarding sparking between the contactors 27—a and 27—b in the event that these should tend to separate at a time while the condenser 13 is discharging its maximum current, there is shunted across these two contactors a fixed resistance 30 of a medium order, this resistance being such as to prevent the rapid discharge of the condenser 13 when the contactors are separated, but at the same time low enough to permit a continued flow of current when these contactors do separate, and also thus to prevent sparking at the contactors 27—a and 27—b or a welding together thereof if they should by chance come together when condenser 13 has just been fully charged and vibrator contactor 11—a happens to be touching vibrator contactor 11—c.

It will be seen that the contactor 27—d of the relay is connected to the instrument ground and that the contactor 27—e is connected to the negative terminal of the green signal light 8 so that when the relay is closed this green signal light 8 will be energized. Likewise, the contactor 27—f is connected to the negative terminal of the amber signal light 9, so that this amber signal light will be energized when the relay is opened. For the purpose of preventing sparking between the contactors 27—d and 27—f, the condenser 31 and the resistance 32 in series with each other are shunted across between these contactors.

It will further be seen that the contactor 27—f is connected to the negative terminals of an audible signal device such as a bell 33, a counter 34, and any other form of electro-mechanical devices 35 such as for example a marking device for marking a position on a pipe. The positive terminal of the bell 33 is connected to the contact point 5—c on the switch 5, while that of the counter 34 is connected to the contact point 5—d and that of any other element 35 is connected to the point 5—e. Thus, when the device is operated with the switch 5 moved to the position where it contacts only the elements 5—a and 5—b, the only signal that will be apparent will be the amber signal light 9 which will flash when a defect in the coating 24 is encountered, together with the approximately simultaneous extinction of green signal light 8. When the switch is moved to the position where it makes contact with the contact point 5—c, the bell 33 will be in the signal circuit and will also be actuated when the signal circuit is energized. Likewise when the switch 5 is moved to the position 5—d the counter will also be actuated each time the signal circuit is energized and when the switch is moved to the position 5—e, all of the different devices including the device 35 will be actuated when the signal circuit is energized.

In the event it should become necessary or desirable to reduce the testing voltage produced by the transformer 15, the variable resistance 36 will be adjusted so as to reduce the rate at which the condenser 13 may discharge through the primary coil 15—a of the transformer 15. Also, in order to retard any feed back from the secondary 15—b to the primary 15—a when the condenser 16 discharges, and thus to damp the oscillations through the oscillatory circuit consisting of the condenser 16 and the secondary 15—b, there is inserted into the primary circuit a check valve 37 consisting of a conventional half wave rectifier which may be of the copper oxide type or any other suitable type and of suitable capacity. This permits relatively free flow of current in the discharge of condenser 13 through the primary 15—a but greatly retards any reverse flow through the primary 15—a.

In order to disclose more completely the specific parts and combinations and the characteristics thereof which have been found to be successful in the device as disclosed, it may be stated that the device is preferably operated from a 6 or 8 volt wet storage battery connected to the terminals 1 and 2. The fuse 3 is a 10 ampere fuse and the voltmeter 4 is an 8 volt D. C. voltmeter. A power pack 6 which has been found suitable is the type having a vacuum tube rectifier. This is preferred over the self-rectifying type because the output voltage polarity is the same even though the connections to the primary power supply should be accidentally reversed. The thermionic vacuum tube is preferably the 6V6, 6V6G, or 6V6GT because such tubes, connected as shown in the drawing, provide a relatively very low plate circuit resistance at zero grid bias, and the plate current can be completely cut off by a negative bias voltage of the order of 25 volts applied to the central grid. All the signal lights are of the 6–8 volt D. C. type and the vibrator is a vibrating switch having a frequency of 30 cycles per second and adapted to operate on 6–8 volts D. C.

The condenser 12 is a 1 microfarad condenser having a test voltage of 600 volts D. C. and the condenser 13, a 5 microfarad condenser having a test voltage of 1000 volts D. C. The resistor 14 is a 2 megohm resistor having a power rating of 2 watts and the transformer 15 is of the ignition coil type.

The condenser 16 has an over-all capacity of 0.00067 microfarad and an effective test voltage of 18,000 volts but in one installation was made up of three units each of a capacity of 0.002 microfarad and each having a test voltage of 6000 volts, these units being placed in series.

The resistor 17 is a 1 megohm resistance and has a power rating of 2 watts while the condenser 18 has a capacity of 0.5 microfarad with a test voltage of 1000 volts D. C., the resistor 19, a resistance of 2 megohms and a power rating of 2 watts and the resistor 20 a resistance of 1 megohm and a power rating of ½ watt. The spark gap 21 has a spacing of approximately 1 millimeter or more. The condenser 28 has a capacity of 0.5 microfarad and a test voltage of 600 volts D. C., while the resistor 29 has a resistance of 35,000 ohms and a power rating of 25 watts. The resistor 30 has a resistance of 500 ohms and a power rating of 25 watts.

The condenser 31 has a capacity of 0.5 microfarad and a test voltage of 600 volts D. C. and the resistor 32 a resistance of 10 ohms with a power rating of 2 watts.

The bell 33 is adapted to be operated by 6–8 volts D. C. The counter 34 is adapted for operation on 6–8 volts D. C. The rheostat 36 has a resistance of 125 ohms and a power rating of 50 watts.

It will be understood that the foregoing is by way of a specific example of instruments and parts found suitable for use together in connection with this invention but that this invention is not limited to these specific parts except insofar as it may be limited by the appended claims.

In placing the instrument in operation the switch 5 will first be turned to provide contact with the point 5—a and if desired also with one or more of the other points. However, until the relay 27 closes no substantial high voltage can be generated by the device even if the power pack be in full operative condition and already producing its normal output voltage, because the points 27—a and 27—b will be separated and the only possible discharge of the condenser 13 will be that permitted by the resistor 30 which will be so slow as to prevent the generation of any substantial voltage by the transformer 15. When the device is first turned on with the switch 5 thus placing the positive terminal of the battery in contact with the point 5a, the heater of the tube 7 will be energized, thus starting the heating of the cathode of that tube. At the same time, energy will be supplied to the power pack 6 and this power pack, as soon as its rectifying tube becomes heated, will begin generating a no-load output voltage of the order of about 375 volts if a 6 volt power source be used. Meantime, the amber signal light 9 will be energized and will burn steadily and if the switch is moved forward to supply energy to the bell 33 and the counter 34 as well as the other mechanical device 35, all these will be energized until the cathode of the tube 7 becomes heated to operating temperature. When this occurs, current will flow in the plate circuit of the tube energizing the relay 27 and causing the relay to close. This closing of the relay will break the circuit to the signalling devices 9, 33, 34 and 35 and will energize the green signal light 8 thus indicating to the operator that the device is ready for operation. If the switch 5 has previously been moved to a position in which contact is made with the point 5—b, then the device is ready for operation except for the fact that switch 5 must be moved to make contact with the points 5—c, 5—d or 5—e, as the case may be, in the event the operator wishes the signals 33, 34 and 35 to operate. If the switch 5 has initially been moved only to make contact with the point 5—a, then when the green signal glows upon operation of the relay 27, the switch 5 must be moved until it makes contact at least with the point 5—b and with the other points 5—c, 5—d and 5—e if the operator wishes the corresponding signals 33, 34 and 35 to operate. With the switch 5 making contact with the points 5—a and 5—b, the vibrating switch 11 will be energized and will begin to vibrate at its predetermined frequency which, in the example given herein, is 30 cycles per second. When this occurs the output voltage of power pack 6 will be reduced by approximately 10% from its voltage of approximately 375 volts when the high voltage generator is without load. It may be noted that this frequency of 30 cycles per second is not critical but that it has been chosen in practice because it is desirable that the frequency be kept as low as possible to avoid unnecessary drain on the battery providing the primary source of power, and it has been found that with the maximum speed at which these testing devices are ordinarily moved, a frequency of 30 cycles per second for the testing impulses is sufficient to insure that no portion of the insulated surface being tested is skipped between testing impulses.

With the vibrator operating, the contactor 11—a will move in one direction into contact with the contactor 11—b whereupon the no-load output voltage of the power pack 6 will be impressed upon the condenser 13 charging it to a voltage reduced below the no-load voltage by approximately 10% as explained above. Then when the contactor 11—a moves to its opposite position and contacts the contactor 11—c, the condenser 13 will be discharged through the contactors 27—b and 27—a of the relay 27 through check valve, or rectifier 37, through resistance unit 36, and through the primary 15—a of the transformer 15. This will be repeated at the rate of 30 times per second. If the vibrator should be turned on while the relay 27 is open and while the power pack 6 is generating its normal output voltage, the condenser 13 will still be discharged through the resistance 30 but the rate of this discharge will be greatly reduced because of the resistance 30. With the relay closed the discharge will be so rapid as to generate an initial peak high voltage in the secondary of the transformer 15 and it is this voltage which provides the test voltage for the device. This voltage will cause the charging of the condenser 16 and of the series condenser system connected in parallel thereto, provided by the condenser 18, taken with the condenser formed by the pipe 25, the insulating coating 24, and the exploring electrode 23. This composite condenser system will then discharge through the inductance provided by the secondary coil 15—b of the transformer and will become charged in the opposite direction. However, this opposite charge will be much smaller than the initial peak due to the damping effect exerted on the circuit by the spark gap 21 and the half wave rectifier 37 as heretofore explained. These oscillations will continue until they completely die out whereupon there will be no transient voltages whatever in the testing circuit until the next oscillatory surge is produced by the next succeeding discharge of the condenser 13 occurring approximately 1/30 of a second later. Considering, for example, the action taking place during an initial impulse of an oscillatory surge, it is to be understood that the spark gap 21 acts merely as a high voltage switch, i. e., when the potential across condenser 16 becomes great enough to break down the insulation afforded by the air at gap 21 a spark or arc is formed through the air and across the gap and the resistance across the gap element becomes of low order, thus passing, with practically no voltage drop thereat, charging current to the series condenser system formed by the exploring electrode 22, the insulating coating 24, and the pipe 25, taken together along with condenser 18. In other words until the potential across condenser 16 becomes great enough to break down the insulation of the air gap of spark gap 21 the resistance across the said gap is practically infinite to the flow of current, whereas after the critical potential has been reached and a spark or arc forms, the resistance along the path formed by the spark or arc itself reduces to a low value.

It may be noted that with a 6 volt power supply the charge placed upon the condenser 13 should be of the order of 340 volts and the peak voltage produced by the secondary of the transformer will be of the order of 6000 volts with the exploring electrode unconnected, and with the exploring electrode connected the peak output voltage will be further reduced by 10% to 20% depending upon the conditions of operation. If a power supply of 8 volts is provided then the peak output voltage with the electrode disconnected should be of the order of 8000 volts and with the exploring electrode connected this figure would likewise be reduced by 10% to 20%. When using an 8 volt power source, however, it may be desirable to place an additional resistance in the filament or heater circuit of the tube 7 and in the filament or heater circuit of the rectifier tube of the power pack 6 in order to prevent an undue shortening of the life of the tube.

With the exploring electrode connected and in the absence of any discharge through the insulation 24, the maximum charge on the condenser 18 and hence the voltage applied to the grid of the tube 7 will be relatively very small and will be immediately dissipated in part by the reversal of the direction of the voltage produced in the testing circuit. In order to compensate for the fact that the reversed voltage will not be as great as the initial voltage, and to prevent the building up of an excessive charge on the condenser 18, th grid leak 19 is provided to constantly drain off from the condenser 18 any such excess charge.

In the event of the exploring electrode 23 encountering a defect, blemish or holiday in the insulation 24, the condenser formed by the pipe 25, the insulating material 24, and the exploring electrode 23, will be in substance momentarily short circuited causing the high voltage charge on condenser 16 to be divided or shared according to fundamental laws with condenser 18, thus greatly building up the amount of negative charge on the condenser 18 and resulting thereby in a like negative voltage being impressed on the grid of the tube 7, through resistance 17, this, in turn, causing the plate current of tube 7 to be immediately extinguished. This charge will not, however, be dissipated by the same path because even though the exploring electrode 23 be completely short circuited through the insulation 24 against the pipe 25 thus completely destroying the condenser effect of these elements, the spark gap 21 will serve to prevent the discharge of the condenser 18 by such path due to the fact that the voltage shared by condenser 16 with condenser 18 upon the occurrence of the holiday results in such a greatly reduced net voltage being placed upon condenser 18 as to make it incapable of bridging the spark gap 21, such net shared voltage being of the order of 100 to 200 volts. As soon as the voltage across the condenser 18 and on the grid of the tube 7 has been changed in a negative direction by the discharge from the initial impulse of a single oscillatory surge, it will have attained far more than a sufficiently negative potential for plate current cut-off so that it will immediately stop the flow of current in the plate circuit of this tube, thus permitting the relay 27 to open. This will immediately stop the further generation of high voltage oscillatory surges by separating the contactors 27—a and 27—b, will cause the extinguishment of the green light 8 by separation of the contactors 27—d and 27—e, will cause the actuation of the signals 9, 33, 34 and 35 by bringing together the contactors 27—d and 27—f, and will provide for the discharge of the voltage of the condenser 18, and thus on the grid of the tube 7, through the resistor 20 as well as the resistor 19, by bringing together the contactors 27—a and 27—c. Resistance 19 has been made as high as possible in order to dispose of as great a part as possible of the discharge of condenser 16 into condenser 18 in the event of encountering a holiday, thus making for great sensitivity and corresponding complete action of the apparatus, as desired, even in event of a weak discharge at a holiday, while at the same time not being of so high a value as to be unable to bleed off the unequal charges of opposite polarity impressed on condenser 18 during normal operation in the absence of a holiday or defect in the insulating coating. However, with such resulting high value of resistor 19, the time required for bleeding off the charge of condenser 18 after encountering a holiday would be excessive for practical considerations, and for this reason resistance 20 has been added as shown so as to assist resistance 19 in bleeding off the charge of condenser 18 after it has been charged upon encountering a holiday. Thus the discharge of condenser 18 by resistance 19 will be aided by the resistor 20 so as to result in a controlled desirably definite time limit or delay before the like negative bias voltage impressed on the grid of the tube 7 through resistance 17 will be reduced sufficiently so that the plate current will again be permitted to flow through this tube and close the relay 27. Thereby the signals 9, 33, 34 and 35 will be de-energized, the resistance 20 will be disconnected from the condition of being in parallel to resistance 19, the green signal light 8 will be re-energized, and the resumption of generation of high voltage will be permitted. Such time limit or delay may be predetermined within practical limits by a proper selection of the value of the resistor 20. It is to be noted that resistor 20 in this example is ½ of the value of resistor 19 which means that resistor 20 more than doubles the rate of bleeding off the voltage of condenser 18 when resistor 20 is made operative by the movement of relay contact 27—a to contact 27—c. The arrangement devised allows resistor 20 to become operative simultaneously as the signals 9, 33, 34, and 35 are initially energized, thus making certain that even in the event of a weak charge for any reason being initially placed into condenser 18 upon encountering a holiday, the signals 9, 33, 34, and 35 will be actuated before resistor 20 has had opportunity to appreciably assist resistor 19 in bleeding off the charge of condenser 18, the object being, of course, to bring about actuation of the signals 9, 33, 34, and 35 in every case before sufficient charge has been drained off of condenser 18 so as to allow normal plate current to again flow in tube 7 as hereinbefore explained and relay 27 to be reclosed thereby before it has completely opened.

It will thus be seen that a means has been provided for carrying out all of the objects and advantages sought by this invention.

Having described my invention, I claim:

1. Apparatus for testing non-conductive material positioned on a conductive member, and locating flaws in the non-conductive material, comprising a testing circuit including a test electrode adapted to be placed in contact with the material to be tested and an electrode adapted to be electrically connected to the conductive member, a condenser connected in the testing circuit in series with the electrodes, a high voltage oscillatory surge generator having its output connected to the testing circuit to energize the same including the electrodes and condenser, a thermionic tube detector including said condenser in its grid circuit whereby the flow of current through the plate circuit of the tube is responsive to the charge on the condenser, and relay means connected to control the generator and connected to the plate circuit of the thermionic tube and responsive to the flow of current therein to control the energization of the generator whereby in operation the generator is normally energized, and is effectively de-energized when the charge on the condenser increases as when the test electrode encounters a flaw in the material tested.

2. Apparatus for testing non-conductive material positioned on a conductive member, and locating flaws in the non-conductive material, comprising a testing circuit including a test electrode adapted to be placed in contact with the material to be tested and an electrode adapted to be electrically connected to the conductive member, a condenser connected in the testing circuit in series with the electrodes, a high voltage oscillatory surge generator having its output connected to the testing circuit to energize the same including the electrodes and condenser, a thermionic tube detector including said condenser in its grid circuit whereby the flow of current through the plate circuit of the tube is responsive to the charge on the condenser, relay means connected to control the generator and connected to the plate circuit of the thermionic tube and responsive to the flow of current therein to control the energization of the generator whereby in operation the generator is normally energized, and is effectively de-energized when the charge on the condenser increases as when the test electrode encounters a flow in the material tested, and means for bleeding the increased charge from said condenser whereby the generator will be energized again.

3. Apparatus for testing non-conductive material positioned on a conductive member, and locating flaws in the non-conductive material, comprising a testing circuit including a test electrode adapted to be placed in contact with the material to be tested and an electrode adapted to be electrically connected to the conductive member, a condenser connected in the testing circuit in series with the electrodes, a high voltage oscillatory surge generator having its output connected to the testing circuit to energize the same including the electrodes and condenser, a thermionic tube detector including said condenser in its grid circuit whereby the flow of current through the plate circuit of the tube is responsive to the charge on the condenser, relay means connected to control the generator and connected to the plate circuit of the thermionic tube and responsive to the flow of current therein to control the energization of the generator whereby in operation the generator is normally energized, and is effectively de-energized when the charge on the condenser increases as when the test electrode encounters a flaw in the material tested, and means actuated by the flow of current through the plate circuit of the thermionic tube for bleeding said charge from the condenser at a predetermined rate when said charge exceeds a predetermined value, whereby the interruption of the generator will continue for a finite period of time.

DICK E. STEARNS.

REFERENCES CITED

The following references are of record in the file of this patent:

UNITED STATES PATENTS

| Number | Name | Date |
|---|---|---|
| 1,561,483 | Pickard | Nov. 17, 1925 |
| 2,032,904 | Bellaschi | Mar. 3, 1936 |
| 2,087,783 | Savage | July 20, 1937 |
| 2,157,929 | Troger | May 9, 1939 |
| 2,258,303 | Schmidt et al. | Oct. 7, 1941 |
| 2,265,717 | Bedford | Dec. 9, 1941 |
| 2,280,119 | Gorman et al. | Apr. 21, 1942 |
| 2,304,513 | Stearns | Dec. 8, 1942 |
| 2,306,529 | Davis | Dec. 29, 1942 |